United States Patent [19]

Moroto et al.

[11] Patent Number: 4,807,492

[45] Date of Patent: Feb. 28, 1989

[54] MECHANISM FOR SUPPORTING TRANSMISSION SHAFTS OF AUTOMATIC TRANSMISSION APPARATUS

[75] Inventors: Syuzo Moroto, Handa; Koji Sumiya, Nishio; Yukihiro Kobayashi, Obu; Takenori Kano, Anjo; Akira Hoshino, Toyota; Yasushi Ando, Toyata; Kazuaki Watanabe, Toyota; Yutaka Taga, Aichi, all of Japan

[73] Assignees: Aisin-Warner Limited; Toyota Jidosha K.K., both of Aichi, Japan

[21] Appl. No.: 852,667

[22] PCT Filed: Jul. 30, 1985

[86] PCT No.: PCT/JP85/00428

§ 371 Date: May 27, 1986

§ 102(e) Date: May 27, 1986

[30] Foreign Application Priority Data

Jul. 30, 1984 [JP] Japan .................. 59-160687
Aug. 6, 1984 [JP] Japan .................. 59-165515

[51] Int. Cl.⁴ .......................................... F16H 57/02
[52] U.S. Cl. .................................. 74/606 R
[58] Field of Search ............... 74/606 R, 761, 759, 74/359, 745, 331, 753, 758, 762; 764/178, 182

[56] References Cited

U.S. PATENT DOCUMENTS

| | | | |
|---|---|---|---|
| 2,787,167 | 4/1957 | Schwab | 74/359 |
| 3,362,245 | 1/1968 | Francuch et al. | 74/359 |
| 3,602,055 | 8/1971 | Hause et al. | 74/759 |
| 3,648,546 | 3/1972 | McNamara et al. | 74/745 |
| 4,106,358 | 8/1978 | Morrison | 74/359 X |
| 4,357,840 | 11/1982 | Winzeler | 74/762 X |
| 4,455,890 | 6/1984 | Kuramochi et al. | 74/767 X |
| 4,528,867 | 7/1985 | Semba et al. | 74/606 R |
| 4,586,401 | 5/1986 | Nogle | 464/182 X |
| 4,602,519 | 7/1986 | Atkins et al. | 74/606 R X |
| 4,606,242 | 8/1986 | Hasegawa et al. | 74/606 R |

FOREIGN PATENT DOCUMENTS 34-12809 8/1959 Japan .

Primary Examiner—Gary L. Smith
Assistant Examiner—Rodney M. Lindsey
Attorney, Agent, or Firm—Howson and Howson

[57] ABSTRACT

A supporting mechanism for a transmission shaft in an automatic transmission apparatus for use in a vehicle, wherein said shaft is rotatably supported at both end portions (1A), (1C) and at the intermediate portion (1B), and the amount of play of said shaft at said intermediate portion is set greater than those at the end portions, with a view to preventing oscillation of the shaft at the intermediate portion between the supporting points and favorably overcoming difficulty in assembly work, e.g., centering associated with supporting at three points. A supporting mechanism for supporting a transmission shaft in an automatic transmission apparatus for use in a vehicle, comprising an input-side transmission shaft (14) and an output shaft (1) arranged coaxially in series with said input-side transmission shaft (14), wherein said output shaft (1) is rotatably supported through the rear end of said input-side transmission shaft (14) by a transmission case at its input-side end and is rotatably supported by the transmission case at its output-side end, with a view to favorably preventing oscillation at the input-side end of the output shaft and shortening the axial length of the entire transmission shaft.

3 Claims, 4 Drawing Sheets

MECHANISM FOR SUPPORTING TRANSMISSION SHAFTS OF AUTOMATIC TRANSMISSION APPARATUS

BACKGROUND OF THE INVENTION

1. Field of the Invention

The present invention relates to a mechanism for supporting transmission shafts in an automatic transmission apparatus.

2. Description of the Prior Art

Automatic transmission apparatus for vehicles have many transmission shafts such as an input shaft, output shaft and intermediate shafts between the input and output shafts. Usually, these transmission shafts are rotatably supported at their both ends.

When the span of support of a transmission shaft is large, or when a load is applied to a mid portion between two supporting points, the transmission shaft tends to be deflected and oscillated at the mid portion thereof. This in turn causes a vibration such as to abnormally load the transmission apparatus, resulting in a deterioration of the durability of the transmission apparatus.

This type of automatic transmission apparatus usually has an automatic transmission case which is constituted by a torque converter housing accommodating the hydraulic transmission unit and an extension housing fixed to the output side, i.e., the rear end, of the transmission case. Usually, each transmission shaft is supported rotatably at two points thereof on an automatic transmission case.

In the conventional automatic transmission apparatus of the type described, the output shaft is supported at its mid portion and the output end or rear end portion thereof by the rear end portion of the transmission case and by the rear end portion of the extension housing, respectively, while the input-side end of the output shaft is unsupported. The present inventors have found that, as a result of current trends for large engine output power and, hence, an increase of the torque to be transmitted, the unsupported input-side end portion of the output shaft tends to be oscillated particularly when the span of support is large or when load imposed on the output shaft acts in the direction perpendicular to the axis of the same at a portion between two supporting points, which in turn causes a large vibration and a consequent abnormal load on the transmission, resulting in a deterioration of durability of the automatic transmission apparatus.

SUMMARY OF THE INVENTION

Accordingly, a first object of the invention is to provide a mechanism for supporting a transmission shaft in an automatic transmission apparatus for vehicles, which is improved to prevent oscillation of the transmission shaft at a portion thereof between supporting points, while avoiding any difficulty which is encountered due to the necessity for the centering of the transmission shaft with respect to three supporting points during assembly of the transmission.

A second object of the invention is to provide a mechanism for supporting a transmission shaft in an automatic transmission apparatus for vehicles, which is capable of effectively preventing oscillation of the unsupported input-side end portion of the transmission shaft, while minimizing the axial length of the transmission shaft assembly as a whole.

In order to meet the first object of the invention, there is provided a supporting mechanism for supporting a transmission shaft in an automatic transmission apparatus for use in vehicles, comprising means for supporting the transmission shaft at both end portions and an intermediate portion of the transmission shaft, wherein the amount of clearance of the transmission shaft at the intermediate portion is greater than those at the both end portions of the transmission shaft.

With this arrangement, since a greater amount of clearance of the transmission shaft is afforded at the intermediate supporting portion than at both end supporting portions, the support at the intermediate portion of the transmission shaft becomes effective only when the amplitude of oscillation of the intermediate portion of the transmission shaft has become large. In consequence, the vibration of the shaft is effectively prevented to ensure higher durability of the constituent parts such as bearings of the automatic transmission apparatus. At the same time, the difficulty in the centering of the transmission shaft during assembly is facilitated by virtue of increase in the amount of clearance afforded at the central supporting point.

In order to meet the second object of the invention, there is provided, in an automatic transmission apparatus for vehicles having an input-side transmission shaft and an output shaft disposed coaxially with and in series to the input-side transmission shaft, a transmission shaft supporting mechanism wherein the output shaft is rotatably supported on an automatic transmission case through the rear end portion of the input-side transmission shaft while the output-side end of the output shaft is supported rotatably by the automatic transmission case.

With this arrangement, since the output shaft is supported also at the input-side end portion thereof, the amplitude of oscillation of the output shaft is suppressed such as to prevent increase of the vibration in the transmission apparatus, thereby ensuring higher durability of the constituent parts such as bearings of the transmission apparatus. This in turn permits an increase in the torque transmission capacity of the transmission, and makes it possible to produce a compact automatic transmission apparatus for vehicles capable of transmitting larger output power of the vehicle engine.

The above and other objects, features and advantages of the invention will become clear from the following description of the preferred embodiments when the same is read in conjunction with the accompanying drawings.

DESCRIPTION OF THE PREFERRED EMBODIMENTS

Figure 1:
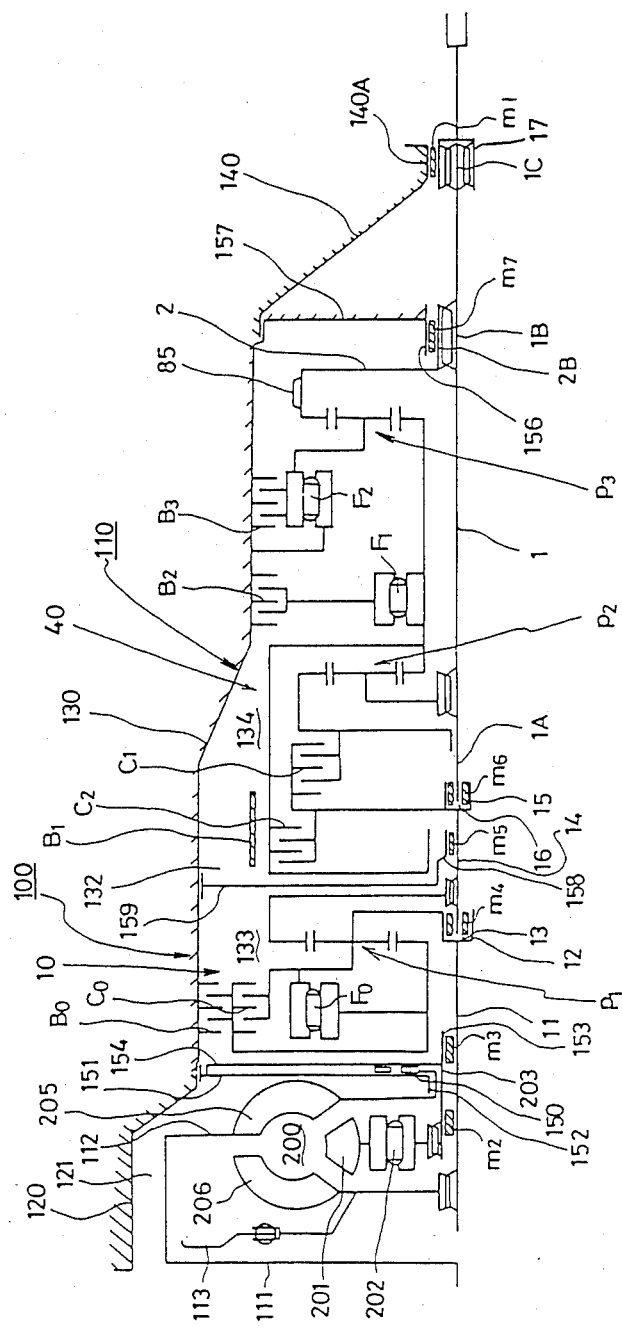
FIG. 1 is a diagrammatic illustration of an embodiment of a transmission shaft supporting mechanism of the invention for supporting transmission shafts of an automatic transmission apparatus for vehicles.
Figure 2:
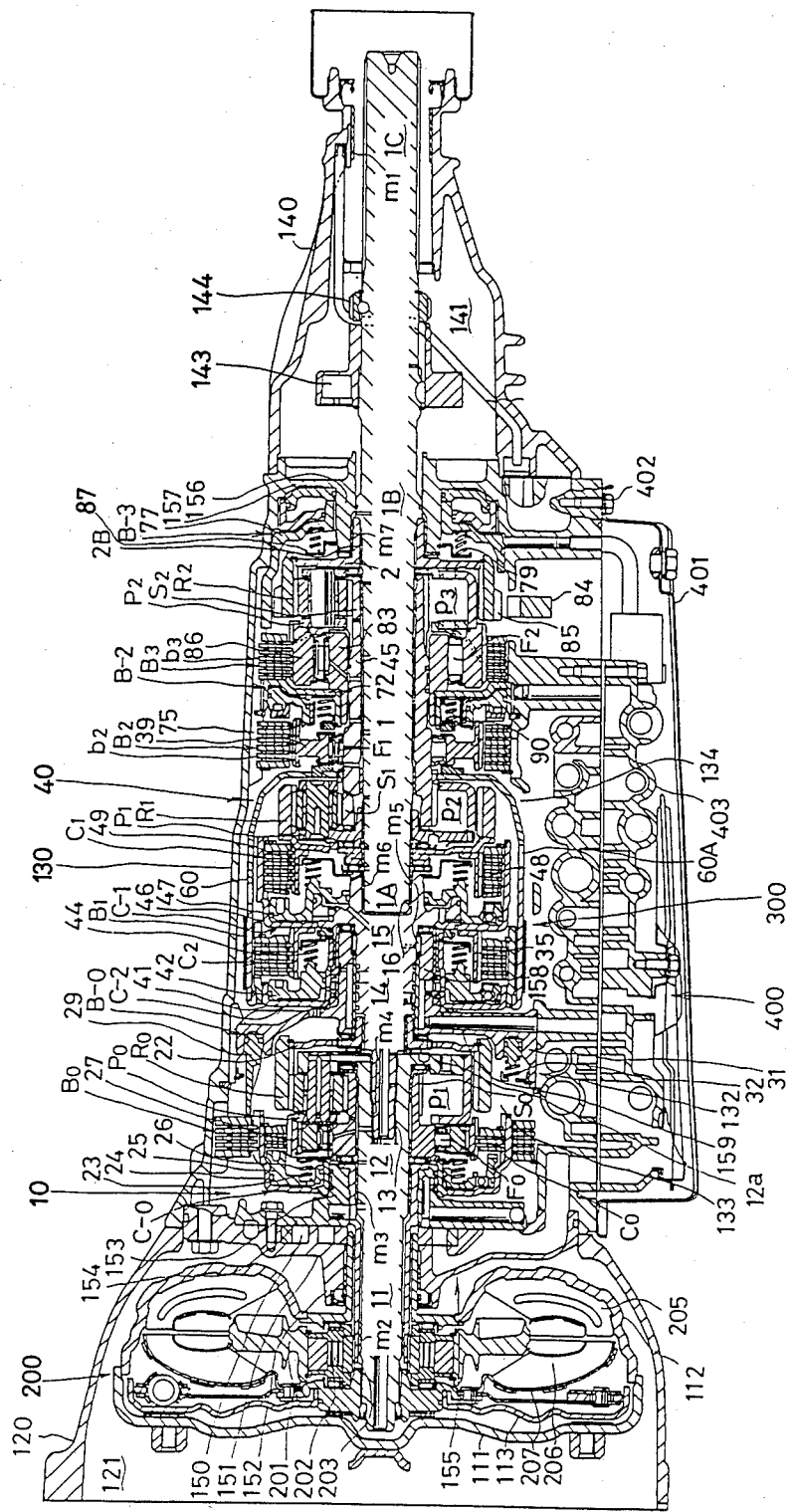
FIG. 2 is a sectional view of the transmission shaft supporting mechanism.

Referring to the drawings, a hydraulic transmission apparatus has a hydraulic transmission device 200 which is in the illustrated case a torque converter, a transmission 300 and a hydraulic controller 400.

The transmission 300 is composed of an overdrive planetary speed changing gear 10, and an underdriving planetary speed changing gear 40 having three forward ranges and one backward range. The overdrive planetary speed changing gear 10 has a first planetary gear set p1, a multi-disk clutch C actuated by a hydraulic servo, a multi-disk brake Bo and a one-way clutch Fo. The underdrive planetary speed changing gear 40 has a second planetary gear set p2, third planetary gear set p3, two multi-disk clutches C1 and C2 actuated by hydraulic servos, a belt brake B1, two multi-disk brakes B2 and B3, and two one-way clutches F1 and F2.

The case 110 of the automatic transmission apparatus has a torque converter housing 120 accommodating the torque converter 200, a transmission case 130 which accommodates the overdrive planetary speed changing gear 10 and the underdrive planetary speed changing gear 40 arranged in series, and an extension housing 140 covering the rear side of the automatic transmission apparatus 100. The torque converter housing 120, transmission case 130 and the extension housing 140 are arranged coaxially and connected by means of a multiplicity of bolts.

The torque converter 200 is accommodated by a torque converter chamber 121 formed in the torque converter housing 120 such as to open forwardly. The torque converter 200 is composed of various parts such as a front cover 111 directly connected to the output shaft of the engine, an annular disk-shaped rear cover 112 welded at its outer periphery to the front cover 111, a pump impeller 205 formed on the inner peripheral surface of the rear cover 112, a turbine runner 206 disposed such as to oppose the pump impeller 205, a turbine shell 207 holding the turbine runner 206, a stator 201 carried by a stationary shaft 203 through a one-way clutch 202, and a direct connection clutch (lock-up clutch) 113 through which the front cover 111 is directly connected to the turbine shell 207.

An annular oil pump body 151 is disposed between the torque converter chamber 121 and a cylindrical speed changing gear chamber 132 on the rear side of the torque converter chamber 121 and is connected to the front end surface of the transmission case 130. The oil pump body 151 accommodates a gear type oil pump 150 and has a forwardly projected tubular portion 152. An oil pump cover 154 secured to the rear side of the oil pump body 151 has a rearwardly projecting cylindrical front support 153 which is coaxial with the cylindrical portion 152. The oil pump body 151 and the oil pump cover 154 in combination form an oil pump housing 155 which in turn constitutes a partition wall separating the torque converter chamber 121 and the transmission chamber 132. The oil pump housing 155 also constitutes the front support wall of the transmission. An intermediate support wall 159 is fitted to an intermediate portion of the speed changing gear chamber 132 of the transmission case. The intermediate support wall 159 has a cylindrical center support 158 which projects rearwardly such as to separate the overdrive gear chamber 133 and the underdrive gear chamber 134 from each other. The transmission case 130 is provided at its rear portion with a rear supporting wall 157 formed by casting integrally therewith and having a forwardly projecting cylindrical rear support 156. The space between the oil pump housing 155 (front support wall or partition wall) and the rear supporting wall 157 constitutes the speed changing gear chamber 132 accommodating the transmission 300, while the space between the rear support wall 157 and the extension housing 140 constitute an output shaft chamber 141 of the speed changing gear. The output shaft chamber 141 accommodates the output shaft, as well as an electronic control sensor rotor 143 and a speed meter drive gear 144 fixed to the output shaft. On the other hand, a sleeve yoke 17 connected to a propeller shaft (not shown) coaxially with the front support 153 is inserted into the rear end of the output shaft chamber 141 and is rotatably supported by a bush (metal bearing) m1.

The stator 201 of the torque converter 200 is supported by the stationary shaft 203 of the one-way clutch 202 fitting in the front support 153. A transmission input shaft 11 constituting the output shaft of the torque converter 200 is disposed inside the stationary shaft 203 and is rotatably supported by two bushes m2 and m3. The input shaft 11 has a rear end 12 of an increased diameter and provided with a rearwardly projecting flange 12a. The rear end 12 of the input shaft 11 is provided with a rearwardly opening axial central hole 13. An intermediate transmission shaft 14 is arranged at the rear side of the input shaft 11 coaxially with and in series to the input shaft 11. The intermediate transmission shaft 14 has a front end received in the axial central hole 13 and is rotatably supported on the wall surface of the axial central hole 13 through a bush m4. The intermediate shaft 14 is rotatably supported at an intermediate portion thereof by the center support 158 of the intermediate support wall 159 through a roller bearing m5. The intermediate transmission shaft 14 has a rear end 15 of an increased diameter having a rearwardly opened axial central hole 16. The output shaft 1 is rotatably mounted at the rear side of the intermediate transmission shaft 14 coaxially with and in series to the transmission shaft 14.

The output shaft 1 as a transmission shaft supported by a supporting mechanism in accordance with the invention is received at its input-side end 1A in the axial central hole 16 of the transmission shaft 14 and rotatably supported by the wall surface of the hole 16 through a bush m6. On the other hand, the intermediate transmission shaft 14 is rotatably mounted on the transmission case 130 through the center support 158 of the intermediate suport wall 159 by means of a roller bearing m5. In the described embodiment, the output shaft 1 is splined to a parking gear flange 2 which meshes at its outer peripheral portion with a parking gear 85 formed on the outer periphery of the ring gear R2 of the third planetary gear set p3 and which has a rearwardly projected central sleeve-shaped boss 2B constituting a cylindrical shaft support. The boss 2B is rotatably mounted on the rear support 156 through a bush m7, so that the intermediate portion 1B of the output shaft 1 is rotatably supported by the rear support wall 157 of the transmission case 130. The output-side end, i.e., the rear end, 1C of the output shaft 1 is splined to the sleeve yoke 17 mentioned before. The sleeve yoke 17 is rotatably supported by the rear end of the extension housing 140 through the bush m1.

Since the front end 1A of the output shaft 1 is received in the axial central hole 16 of the intermediate transmission shaft 14 and supported by means of the transmission case 130, it is possible to prevent the oscillation of the front end 1A of the output shaft 1 without fail. The sensor rotor 143 and the speedometer drive gear 144 are fixed to the portion of the output shaft 1 within the output shaft chamber 141.

It is to be noted also that, since the end of the intermediate transmission shaft 14 is received in and supported by the central axial hole in the rear end of the input shaft 11, and since the front end 1A of the output shaft 1 is received in and supported by the central axial hole 16 in the rear end of the intermediate transmission shaft 14, the overall length of the transmission shaft assembly as a whole is reduced advantageously.

In this supporting mechanism for supporting the front end 1A, intermediate portion 1B and the rear end 1C of the output shaft 1, the amount of clearance between the front end 1A and the center support 158 of the transmission case and the amount of the clearance between the rear end 1C and the rear end of the extension housing 140 are determined to be substantially equal to each other, while the amount of clearance between the intermediate portion 1B and the rear support 156 is selected to be not smaller than two times but not greater than four times as large as the amounts at output shaft end portions 1A to 1C. If the amount of clearance at intermediate portion 1B is selected below a value which is two times as large as the amounts of clearance at output shaft end portions 1A and 1C, the possibility of sliding contact between the intermediate portion 1B and its support is increased to create a supporting condition which is materially equivalent to such a supporting mechanism as having three supporting points. Conversely, if the amount of clearance at intermediate portion 1B is above a value which is four times as large as the amounts of clearance at end portions 1A to 1C, the effect for suppressing the oscillation of the output shaft 1 at the intermediate portion 1B becomes insufficient. Thus, in the described arrangement, the output shaft 1 is supported rotatably at two portions, i.e., at the front and rear end portions 1A and 1C thereof, during power transmission under steady condition of running.

Figure 3:
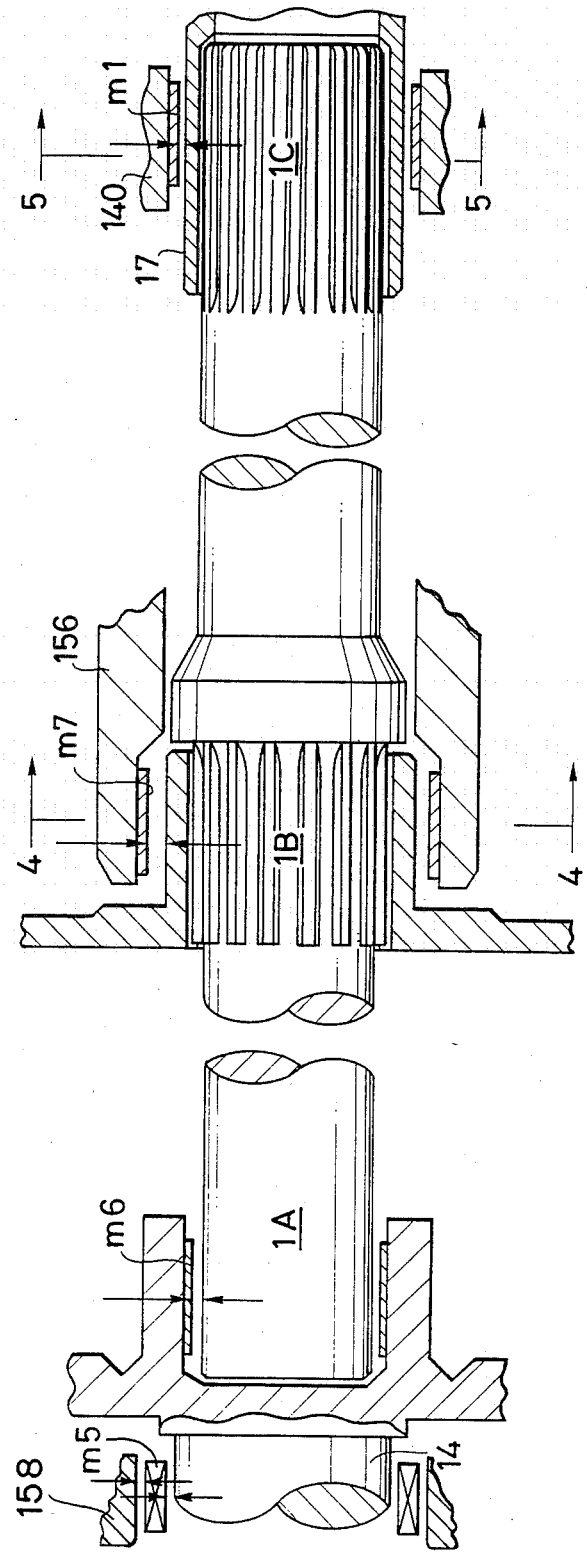
FIG. 3 is an enlarged fragmentary axial section, showing details of clearances at locations 1A, 1B and 1C in FIG. 2.
Figure 4:
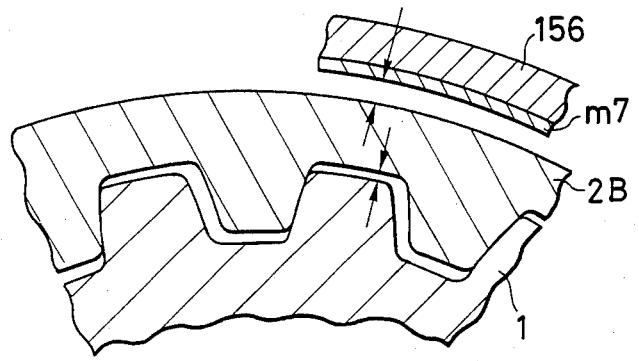
FIG. 4 is an enlarged fragmentary radial section, taken on plane 4—4 of FIG. 3 showing details of the clearance at location 1B.
Figure 5:
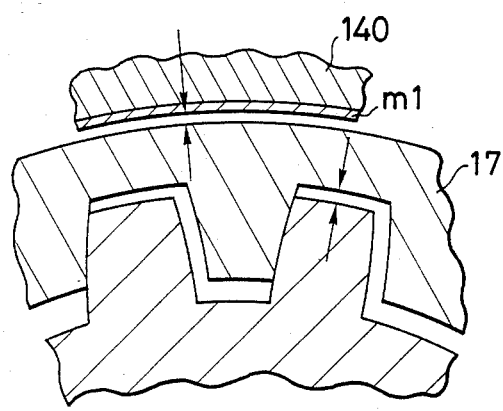
FIG. 5 is an enlarged fragmentary radial section taken on plane 5—5 of FIG. 3, showing details of the clearance at location 1C.

The relationship between the clearances at locations 1A, 1B and 1C is as shown in FIGS. 3, 4 and 5, it being understood that, in each case, the clearance is shared. For example, at location 1A, the clearance is the sum of the clearances at bushing m6 and at roller bearing m5. At location 1C, the clearance is the sum of the clearance between yoke 17 and bushing m1 and the clearance of the spline connection. At location 1B, the clearance is the sum of the clearance between parking gear boss 2B and bushing m7 of the rear housing support 156 and the clearance of the spline connection between shaft 1 and the parking gear flange.

The intermediate portion 1B of the output shaft 1 is often loaded in the direction perpendicular to the axis thereof. This occurs when, for example, a parking pawl 84 is moved upwardly as viewed in the drawings into engagement with the parking gear 85 through the action of a parking brake lever, linking cable and a parking rod all of which are well known and hence neglected from the drawings. In such a case, the intermediate portion 1B is bent and oscillates as the output shaft 1 rotates. If the amplitude of this oscillation is increased to a certain level, the intermediate portion 1B comes to be supported by the rear support 156 through the boss 2B of the parking flange, so that any further increase in the oscillation amplitude is prevented advantageously. The same effect is produced also when the rotation balance of the output shaft is lost due to, for example, a lack of circumferential uniformity of the braking friction force in the multi-disk brake.

As has been described, in the described embodiment of the invention, the amount of clearance of the output shaft 1 at the intermediate portion 1B afforded by the clearance between the intermediate portion 1B and the rear support 156 is preferably equally shared by two parts: namely, a gap existing by reasons of the spline engagement between the outer periphery of the output shaft 1 and the sleeve-like boss portion 2B, as seen in FIG. 4 and the gap between the sleeve-like boss 2B and the rear support 156 through the bush m7 as seen in FIGS. 3 and 4. Such an arrangement produces the following effects:

(a) It is possible to preserve large clearances at the intermediate portion 1B of the output shaft for the prevention of skew of the parking gear flange, so that the assembly of the parking gear flange is facilitated advantageously.

(b) When the parking gear flange 2 is used during parking, not all part of the radial load is transmitted from the parking flange 2 to the output shaft 1 but, rather, not a small portion of the load is transmitted directly to the transmission case 130. Therefore, the parking gear 85 can move only a distance which is equal to the clearance between the transmission case 130 and the parking gear flange 2, which distance being much smaller than that observed when the flange 2 is formed integrally with the output shaft 1. This in turn effectively prevents any unintentional disengagement of the parking brake.

(c) By providing the clearance afforded between the output shaft 1 and the boss portion 2B of the parking gear flange 2, the flange 2 is floated with respect to the output shaft 1 so that the durability of the thrust bearing is improved.

The first planetary gear set p1 is disposed behind the input shaft 11 within the overdrive gear chamber 133, and the ring gear Ro of the first planetary gear set p1 is coupled to the intermediate transmission shaft 14 through a flange plate 22, while the carrier Po of the same is connected to the flange portion 12a of the input shaft 11. The first planetary gear set p1 also has a sun gear So which is formed on the inner race shaft 23. At the front side of the first planetary gear p1, a rearwardly opening first hydraulic servo drum 24 is fixed to the inner race shaft 23, and an annular piston 25 fits in the space between the outer peripheral wall of the servo drum 24 and the inner race shaft 23 such as to form a hydraulic servo C-O of the clutch C0. A return spring 26 fits on the inner race shaft 23, while the clutch C0 is mounted inside the outer peripheral wall, such that the first hydraulic drum 24 is connected to the carrier P0 through the clutch C0. A one-way clutch F0 having an inner race constituted by the inner race shaft 23 is provided on the inner periphery of the first hydraulic servo drum 24. The clutch C0 and the brake B0 are disposed between the outer race 27 and the transmission case 130. A piston 29 fits in the front portion of an outer cylinder 31 of the center support 159 such as to form a hydraulic servo B-0 for the brake B0. A return spring 32 is provided on the end of the outer cylinder 31.

A rearwardly opening hydraulic servo drum 41 is rotatably carried by the center support 158 within a front portion of the under drive gear chamber 134, and an annular piston 42 fits in the space between the inner and outer peripheral walls of the servo drum 41 thereby forming a hydraulic servo C-2 of the clutch C2. At the same time, a return spring 44 fits on the inner peripheral wall of the servo drum 41, while the clutch C2 is mounted on the inner surface of the outer peripheral wall of the same. At the rear side of the second hydraulic servo drum 41, a third hydraulic servo drum 46 is welded to the rear end of the intermediate transmission shaft 14. The third hydraulic servo drum 46 opens rearwardly and has an annular clutch hub 35 welded to the front end portion thereof. At the same time, an annular piston 47 fits in the annular space between the end wall 15 of the intermediate transmission shaft 14 and the outer peripheral wall of the servo drum 46 such as to constitute the hydraulic servo C-1 for the clutch C1. A return spring 49 fits on the inner periphery, while the clutch C2 is mounted on the outer periphery of the annular clutch hub 35, such that the second and third hydraulic servo drums 41 and 46 are connected to each other through the clutch C2. The second planetary gear set p2 is disposed on the rear side of the third hydraulic servo drum 46. The second planetary gear set p2 has a ring gear R1 which is coupled to the third hydraulic servo drum 46 through the annular clutch hub 48 and the clutch C1. The second planetary gear set p2 also has a carrier P1 splined to the front end 1A of the output shaft 1 and a sun gear S1 which is formed integrally with a sun gear shaft 45. A connection drum 60, which is designed to form a minimal space for encasing the second and third hydraulic servo drums 41, 46 and the second planetary gear set p2, is fixed at its front end to the outer periphery of the second hydraulic servo drum 41, while the rear end is connected to the sun gear shaft 45 at the rear side of the second planetary gear set p2. The belt brake B1 is provided on the outer periphery of the second servo drum 41.

A spline 75 formed in the portion of the transmission case 130 behind the brake B2 carries the frame disk b2 of the brake B2 and the brake disk b3 of the brake B3 which are splined thereto from the front side. An annular space between the outer peripheral surface of the rear support 156 on the rear support wall 157 behind the splined brake disks and the transmission case 130 such as to form a hydraulic servo B-3 of the brake B3. The return spring 79 of the hydraulic servo B-3 is retained by a retainer 87 attached to the front end of the rear support 156. The one-way clutch F1 provided inside the brake B2 has an inner race constituted by the sun gear shaft 45 and an outer race 39 connected to the brake B2. At the rear side of the one-way clutch F1 are disposed a biasing means 90 with a returning function and the one-way clutch F2 having an inner race 83 splined to the inside of the outer wall of a fourth hydraulic servo drum 72. The third planetary gear set p3 has a sun gear S2 formed integrally with the sun gear shaft 45 and a carrier which is connected both to the outer race 86 of the one-way clutch F2 on the front side thereof and the brake B3. The ring gear R2 of the third planetary gear set p3 is provided on the outer periphery thereof with the ring gear R2 mentioned before and is splined to an intermediate portion 1B of the output shaft 1. The parking gear 85 is adapted to be engaged by the parking pawl 85 when the select (shift) lever of the automatic transmission selects the parking (P) position, thereby locking the output shaft 36.

A hydraulic controller 400 is disposed in a valve body 403 accommodated by the oil pan 401 which is fastened to the underside of the transmission case 130 by means of bolts 402. In the operation of the transmission 300, the hydraulic controller 400 selectively delivers hydraulic pressure to the hydraulic servos of respective friction engagement devices in accordance with the running conditions such as throttle openings. Consequently, the clutches and brakes are selectively engaged and disengaged such as to perform the speed change over four forward ranges and one backward range. Examples of the relationship between the states of the clutches, brakes and one-way clutches and the range of speed change performed is shown in Table 1 below.

TABLE 1

| RANGE | CLUTCH | | | BRAKE | | | | OWC | | |
|---|---|---|---|---|---|---|---|---|---|---|
| | $C_0$ | $C_1$ | $C_2$ | $B_0$ | $B_1$ | $B_2$ | $B_3$ | $F_0$ | $F_1$ | $F_2$ |
| P | E | X | X | X | X | X | X | f | f | f |
| R | E | X | E | X | X | X | E | f | f | f |
| N | E | X | X | X | X | X | X | f | f | f |
| D 1 | E | E | X | X | X | X | X | (L) | f | L |
| 2 | E | E | X | X | X | E | X | (L) | L | f |
| 3 | E | E | E | X | X | E | X | (L) | f | f |
| 4 | X | E | E | E | X | E | X | f | f | f |
| S 1 | E | E | X | X | X | X | X | (L) | f | L |
| 2 | E | E | X | X | E | X | X | (L) | (L) | f |
| 3 | E | E | E | X | X | E | X | (L) | f | f |
| L 1 | E | E | X | X | X | X | E | (L) | f | (L) |
| 2 | E | E | X | X | E | E | X | (L) | (L) | f |

In Table 1, a symbol E represents that the clutch of the brake is in the engaging or on state, while a symbol L represents that the one-way clutch is made to engage only during engine driving but is not engaged during engine braking. On the other hand, a symbol (L) represents that the one-way clutch is in the engaged state in the engine driving condition but the engagement is not always necessary because the power transmission is ensured by a clutch or brake parallel therewith, i.e., the locked state of the transmission. A symbol f represents that the one-way clutch is in the free state, while a symbol X shows that the clutch or the brake is in the disengaged or off state.

What is claimed is:
1. In an automatic transmission for use in a vehicle, the transmission comprising:
   a transmission case;
   an extension housing connected to the transmission case;
   an input shaft;
   an output shaft disposed coaxially with and in series to the input shaft;
   a clutch mechanism for connecting the input shaft and the output shaft; and
   a parking gear mechanism provided in the vicinity of an intermediate portion of the output shaft, having a parking gear for retaining the output shaft, said parking gear having a flange with a sleeve-like boss portion splined to the output shaft;
   an improved transmission shaft supporting mechanism comprising:
   means supported by the transmission case for supporting the output shaft at the input-side end portion thereof, the output-side end portion thereof being supported by the extension housing, and an intermediate portion thereof being supported by the transmission case through the sleeve-like boss portion of the parking gear flange, the output shaft being supported at each of said portions with a clearance;

in which the amount of clearance at the intermediate portion is greater than the clearances at the end portions of the output shaft; and in which the clearance at the intermediate portion of the output shaft is shared by a gap between the output shaft and the sleeve-like boss portion of the parking gear flange splined thereto and by a gap between the sleeve-like boss portion of the parking gear flange and the transmission case.

2. An automatic transmission according to claim 1, wherein the amount of play at the intermediate portion of the output shaft is two or four times as large as the amount of play at each of the end portions of the output shaft.

3. An automatic transmission according to claim 1, wherein the means supported by the transmission case for supporting the output shaft at the input side end portion thereof includes an intermediate shaft located between the input and output shafts, and wherein the input-side end portion of the output shaft is supported by the transmission case through said intermediate shaft.

* * * * *